INVENTOR.
Eugene Odin
BY
Campbell Brumbaugh & Lee
ATTORNEYS

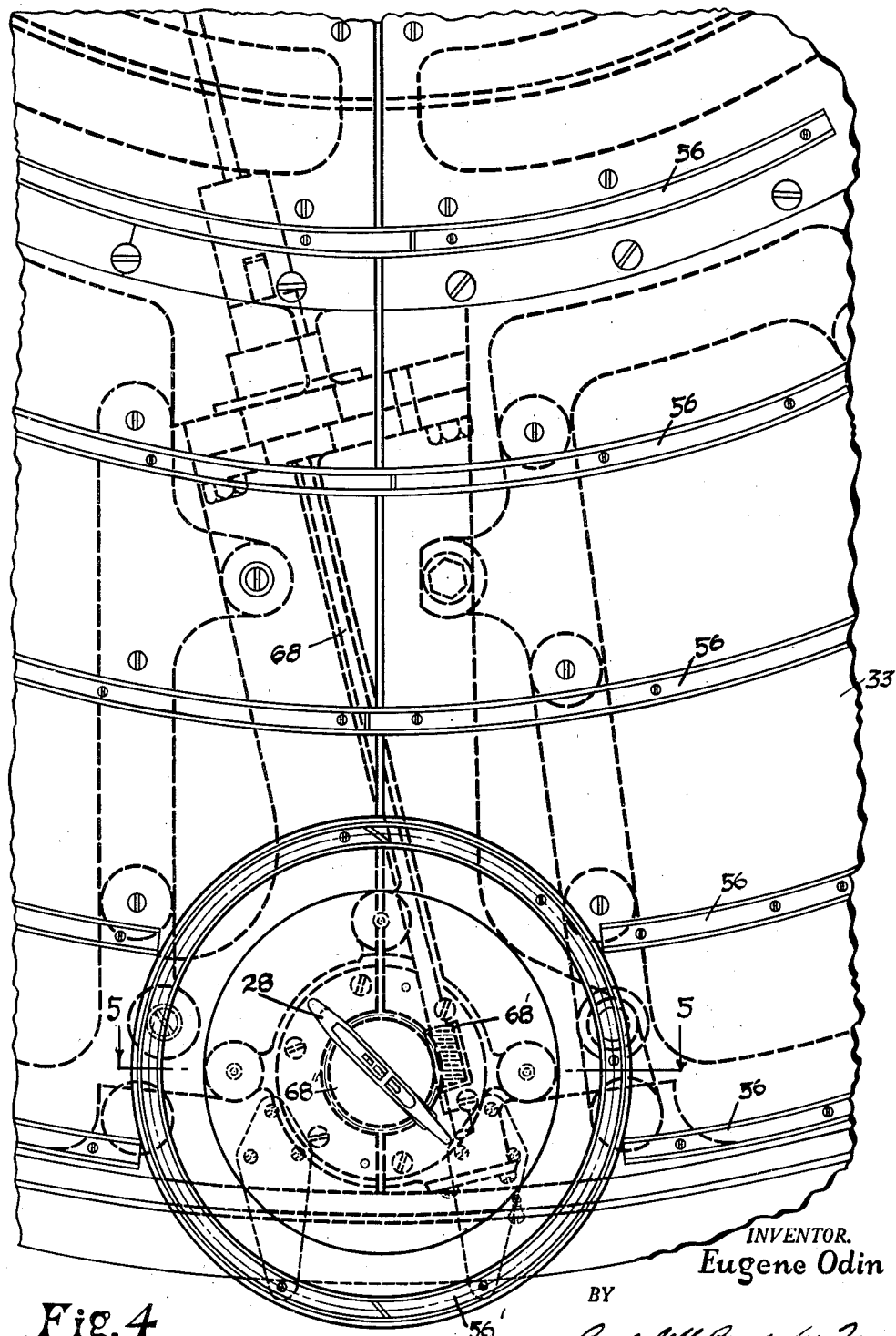

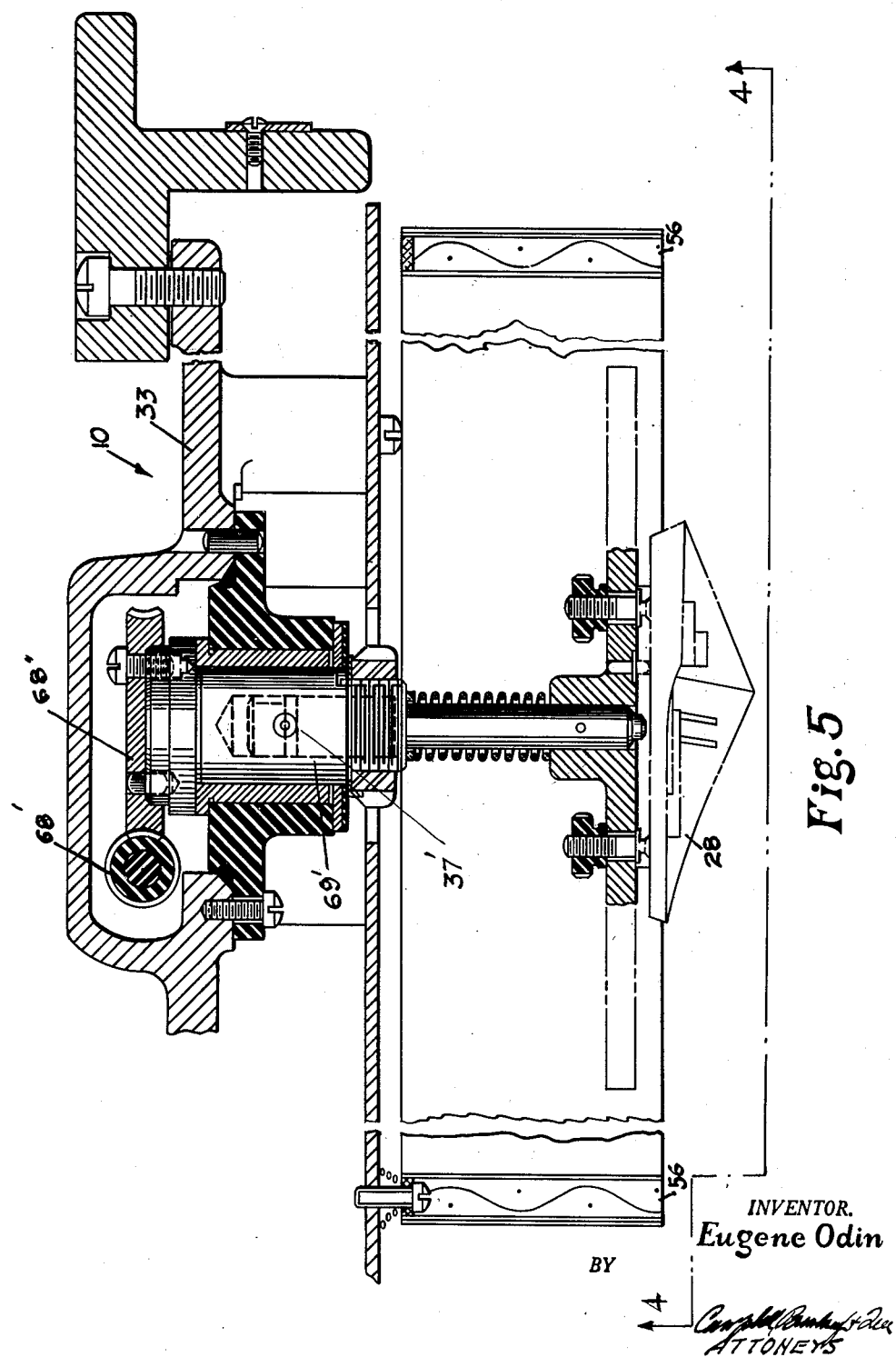

Patented Mar. 21, 1950

2,501,350

UNITED STATES PATENT OFFICE 2,501,350

MANEUVERABLE TARGET SIMULATING APPARATUS FOR ORDNANCE TRAINING

Eugene Odin, Brooklyn, N. Y., assignor to Arma Corporation, Brooklyn, N. Y., a corporation of New York Application June 5, 1946, Serial No. 674,504

14 Claims. (Cl. 35—25)

This invention relates to ordnance apparatus, and has particular reference to apparatus for instruction in the use of the complicated instruments for directing projectiles to targets, especially submarine torpedoes, although the invention is not limited to that use.

In training candidates for fire or torpedo control officers, including submarine command, it is impractical to shoot projectiles, such as torpedoes, at real ships for training purposes, so that it has become the practice to provide model ships variously arranged for movement relatively to the observation station, and imaginary projectiles are aimed and fired at such models in simulation of actual battle action. Such arrangements, while useful in elementary training and familiarization with the observation and calculating instruments, provide but meager instruction in actual battle conditions, and hence a more realistic arrangement for that purpose is desirable.

In accordance with the present invention, training apparatus is provided, in which a number of ship models are movably arranged on a mount in simulation of a ship convoy target with mechanism under the control of the instructor for moving the model mount bodily, for rotating the same and for adjusting the rotation of one or more of the models relatively to the others. The usual means is provided for determining the percentage of hits made by imaginary projectiles, such as torpedoes, aimed and fired at selected units of the convoy target according to standard calculated data provided by actual computing instruments.

The training apparatus of this invention is particularly characterized by the arrangement of the model mount which comprises a rotor mounting an inverted group of ship models simulating the ships of a convoy, a central rotatable portion thereof having gearing for driving the same, and outstanding extensions on the central portion mounting outlying ship models, with means for rotating such outlying models, including smaller rotors for carrying those outlying models, driven by non-radial worm shafts, a pair of such shafts being driven by common gearing away from the center of rotation of the central rotatable portion, and each common gearing being driven by the same concentric floating gear, with the floating gear itself being driven by an eccentrically-placed gear of a train which is independently rotatable by hand and carries a ship model on the outermost gear of the train. Means are provided for oscillating the central portion of the main rotor at will, so as to simulate evasive zig-zag motion of the target, and the curtains simulating the surface of the sea depend from the main rotor behind and adjacent the models, and being flexible, move as the large rotor moves, so that realistic simulation of the moving surface of the sea is provided. The center trunnions for the models have separate bayonet joint connections with sockets for substituting different models, the members provided with such sockets having the aforementioned worm gears.

It will be seen that with the ordnance model mounting of this invention and the cooperating elements used in conjunction with standard calculating and aiming apparatus, personnel may be trained under conditions accurately simulating those of actual battle, and without the expense and nuisance of conducting full scale training operations at a remote site available for them.

For a more complete understanding of the invention, reference may be had to the accompanying drawings, in which.

Figure 1:
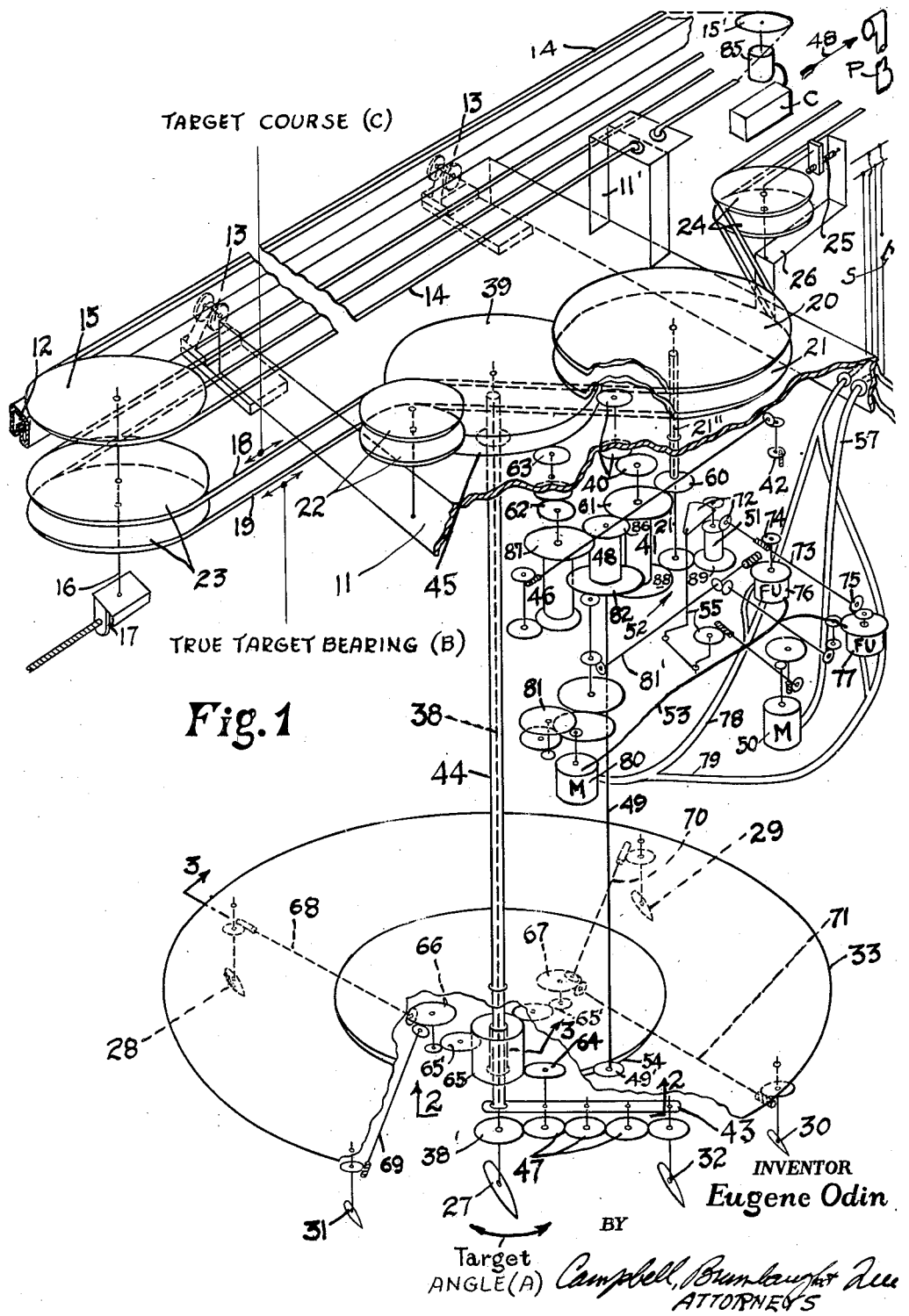
Figure 1 is an expanded perspective view of the ordnance training apparatus of this invention, adapted to submarine torpedo aiming instruction.
Figure 3A:
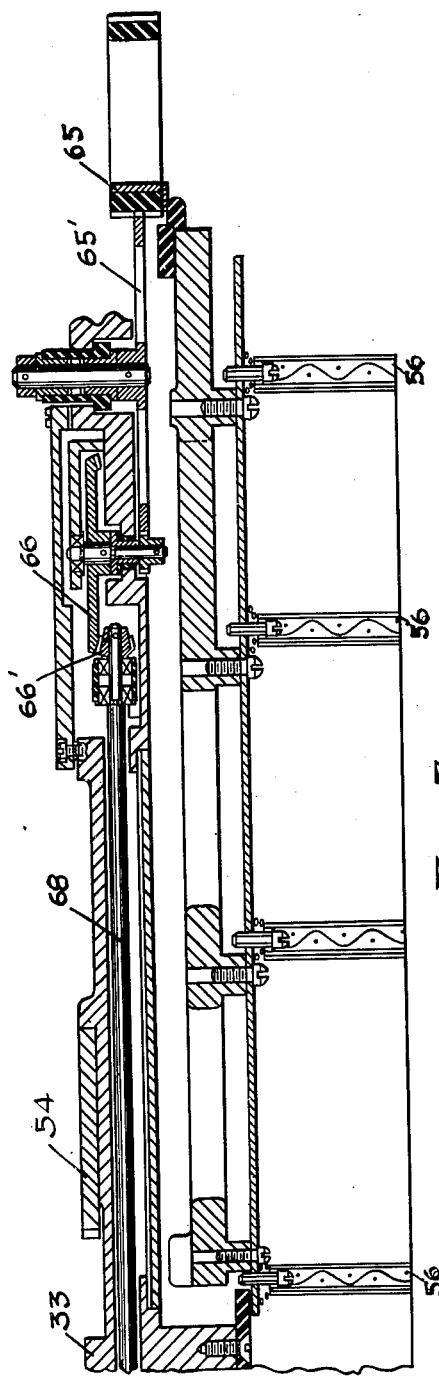
Figure 3B:
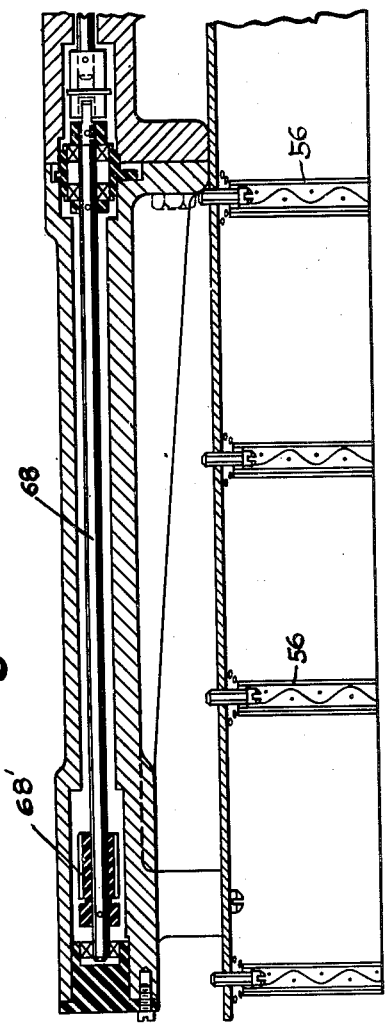

Figs. 3a and 3b jointly constitute a detailed cross-sectional view as seen along the line 3—3 of Fig. 1 through the main rotor carrying the ship models and showing the driving means of a ship model of the convoy group;

Fig. 4 is a bottom view of the rotatable mounting and driving means for one of the convoying destroyers, as seen along the line 4—4 of Fig. 5; and Fig. 5 is an enlarged transverse section through the mounting means of Fig. 4, as seen along the line 5—5 thereof.

Referring to Fig. 1, numeral 33 designates the rotor for the screen ships of the rotary model system supported on square carriage 11 movably depending by rollers 13 from barn-door type rails 12, only one of which is shown, the other rail being understood to lie above the plane of the drawing. The rollers 13 on carriage 11 are double rollers and the rails 12 are re-entrant rails to receive them accurately. Firmly fixed to the carriage 11 is an up-standing strut 11' for connecting the carriage 11 to the cable 14 passing around idler sheave 15 and driving sheave 15', the former being carried on shaft 16 mounted on tightening block 17, slidably mounted on a casting secured to the rails 12 to the left and having a screw and nut combination similar to that shown at 26 to be described, for taking up slack in the drive cable 14. Cable 14 draws the whole main assembly 11, 33, back and forth on the rails 12 for range change effect on an observer's periscope P, shown at the right, this change of range being provided by a known type of target data computer C, as will be described, and is utilized to control motor 85 connected to sheave 15' for driving the same and the connected cable 14.

Two additional cables, 18 and 19 (driven at their ends, not shown) pass partly around large sheaves 20 and 21, respectively, carried by carriage 11, whose motions cause rotation of sheaves 20 and 21. The arc of contact between cables 18 and 19 and large sheaves 20 and 21 is increased by passage of these cables 18 and 19 over pairs of idler sheaves 22, 23. Idler sheaves 22 and 24 are carried by carriage 11, while idlers 24 are mounted on a bracket 26 attached to carriage 11. The idler sheaves 24 are provided with cable-tightening means comprising a nut and screw combination 25 interposed between the shaft of sheaves 24 and bracket 26 whereby the cables 18 and 19 may be tightened against sheaves 20 and 21. Sheaves 23, being carried on shaft 16, are adjusted when sheave 15 is adjusted to thereby tighten cable 14 at that point.

Figure 2:
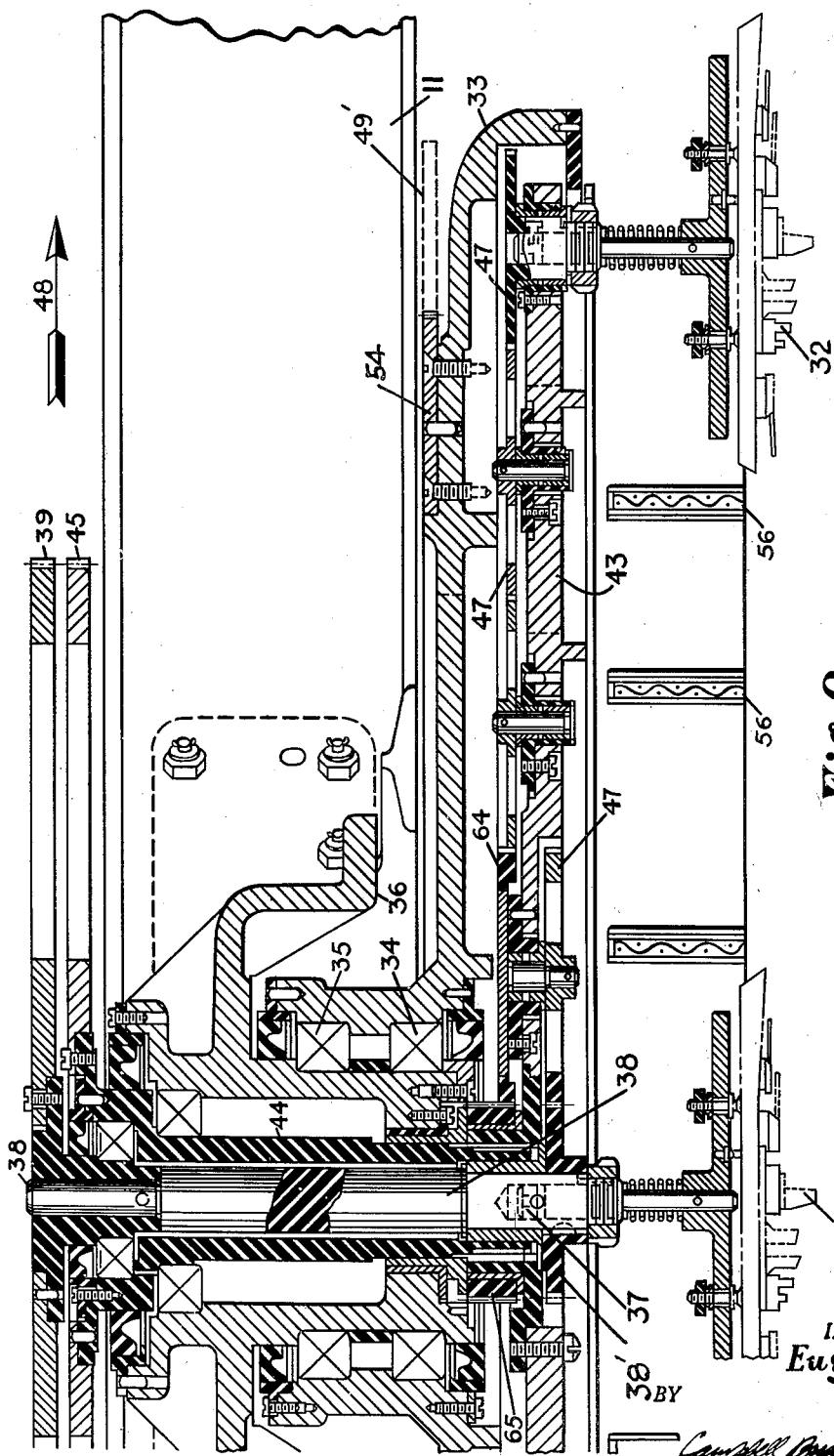
Fig. 2 is an enlarged axial section through the rotor as seen along the line 2—2 of Fig. 1.

The upper large sheave 20, by its shaft 21', journalled in tubular shaft 21" rotating on frame 11, and gearing 52, drives the lower gear 88 of differential 41 whose spider drives upper large gear 39 through pinions 40. Large gear 39 is pinned to shaft 38 journalled in tubular shaft 44 and carries at its lower end the gear 38' meshing with a train of gears 47 carried by a member 43 shown as a radial bar in Fig. 1, but actually a disc as shown in Fig. 2. Similarly, the lower sheave 21, through its tubular shaft 21" journalled in frame 11, and its integral pinion 60, drives the upper gear 61 of differential 41, which is connected by gears 62 and 63 to the lower large gear 45 connected to tubular shaft 44 carrying at its lower end the member 43, so that the latter rotates with shaft 44 and carries the gear train 47 with it.

The screen ships models of the rotary model system of Fig. 1 are carried by a recessed disc 33 which floats on bearings 34 and 35 on the center casting 36 of the traveling frame 11, as shown, particularly in Fig. 2. As there shown, a secondary disc 43 shown as a radial bar in Fig. 1 is also carried in the recess of main disc 33, although the former moves relatively to the latter. Main disc 33 is rotated on its bearings 34 and 35 by a pinion 49' meshing with a gear 54 on disc 33 and connected to shaft 49, whose operation will be described.

Journalled on tubular shaft 44 is a sleeve pinion 65 driven by gear 64 connected to the inner gear of the train 47 carried by secondary disc 43, as shown in Figs. 1 and 2. Sleeve gear 65 in turn drives gears 66 and 67 through intermediate gearing 65' shown in Figs. 1 and 3a. Since the parts driven by gears 66 and 67 are the same, the drive of the latter will be described in connection with Figs. 1, 3a, 3b, 4 and 5.

Referring to Fig. 3a, gear 66 is shown driving a pinion 66' fixed on a long non-radial shaft 68 journalled on rotary disc 33. As shown in Figs. 3b, 4 and 5, the free end of shaft 68 is fitted with a worm 68' which meshes with a worm wheel 68", shown in Fig. 5 as carrying a socketed stub shaft 69' journalled in disc 33. As shown particularly in Fig. 1, non-radial shaft 69 and its identical appurtenant parts are also driven from gear 66, whereas gear 67 similarly drives non-radial shafts 70 and 71 and parts identical to those shown in Figs. 3a, 3b, 4 and 5. It will be understood that certain parts of Fig. 1, such as shafts 38 and 44, have been shown disproportionately long or otherwise out of proportion, in the interest of clarity, actual proportions being shown by Figs. 2, 3a, 3b, 4 and 5.

The arrangement of ship models is shown in skeleton form in Fig. 1, and includes a model of a relatively large target ship 27 at the center of the convoy, which is represented by the models of outlying destroyers 28, 29, 30 and 31 and the attendant cruiser 32, or other target craft in any other arrangement.

As shown particularly in Figs. 2 and 5, the ship models are mounted upside down in order to be freely accessible from the floor for interchanging the models or substituting different models, each mounting for these models being equipped with a bayonet joint socket such as is shown at 37 in Fig. 2, with which ship model 27 is connected to shaft 38, as shown in Fig. 2. A similar bayonet joint socket is designated 37' in Fig. 5 for connecting and disconnecting models 28 from shaft 69'.

The distant periscope P, with which the ship models are viewed, is positioned in the direction of arrow 48 in Figs. 1 and 2 and is of standard optical construction except that it is equipped with an erecting lens so that the ship models appear right side up in its field of view.

Suspended from concentric rings on the under side of rotary disc 33 are curtains 56, of sea green material, such as cloth, which being flexible, permits the assembly of ships to approach so closely the periscope P that it lies within the circle of destroyers for special close-up training. As motion is imparted to disc 33, the sea green cloth constituting curtains 56 and 56', realistically simulate the surface of the ocean as seen in the periscope P. The inversion of the ship models enables the curtains to swing and move at will by gravity and serve as a mobile background for the model ships and for changing models.

Having described the structure which carries the ship models, the additional mechanism which causes it to rotate and oscillate will be described. As previously stated, the movement of the sheaves 20 and 21 is by cables 18 and 19, which are driven by motor mechanism similar to 85 on Fig. 1 from computer C, and impart relatively rotation to telescoped shafts 38 and 44, which in turn move the secondary disc 43, its appurtenant gearing 47, and outlying ship models 28, 29, 30 and 31, as well as ship models 27 and 32. This movement is modified by rotation of main disc 33 by coaction between its gear 54 and meshing pinion 49' on the lower end of shaft 49 connected to the spider of differential 48, the output of which is a compound motion of the direct rotation of sheave 21 and a special oscillating motion superimposed by motor 50 upon the steady motion of sheave 20.

This oscillating motion is fed into differential 51 by gearing 52, and is imparted by motor 50 through linkage system 55 at the will of the observer at the periscope station P, and may be produced by a switch S connected to the motor 50 by cable 57, in order to make the rotor 33 for the screen ships oscillate bath and forth to give the illusion in the field of view of the periscope that the whole convoy of model ships is zigzagging. This oscillation-producing linkage system 55 is connected by a gear sector and pinion combination 72 to the spider of the differential 51.

The compound motion output of differential 51 is amplified by servo-system 53, including the slow speed follow-up transmitter 76 and the high speed follow-up transmitter 77, both of conventional construction, by means of shaft 73 driven from the upper gear of differential 51 and connected to transmitters 76 and 77 through worm and worm wheel combinations 74 and 75, respectively. Follow-up transmitters 76 and 77 are connected by cables 78 and 79 to follow-up motor 80 which, through gearing 81, drives the lower gear 82 of differential 48, whose spider drives shaft 49, as stated. Follow-up of transmitters 76 and 77 are restored mechanically in the usual way, by the shaft 81' and appurtenant gearing connected to gearing 81, as shown.

Further superimposed upon the motion imparted by the aforementioned mechanism to the ship models is a manual motion introduced by hand crank 42 connected through differential 46 and gearing 62, 63 and 45 to tubular shaft 44, so as to change the angular position of member or secondary disc 43 and with it the ship model 32. The orientation or bearing of the other ship models is not changed by action of the hand crank and continue their original motions, as does also ship model 32 while being swung around.

In operation of the ordnance training apparatus of this invention, as applied to submarine torpedo aiming and firing training, the cable 14 is driven by motor 85, controlled by the range output of a target data computer C of conventional design, and not forming part of the present invention, and cables 18 and 19 are driven likewise by motors, not shown, to give target course (C) and true target bearing (B), respectively, from the same computer C. One example of such computer is disclosed in copending application Serial No. 253,260, filed January 28, 1939, by applicant and another, whereby change of range and bearing of the target convoy carried by rotor 33 may be generated and fed through motors, like that shown at 85, with respect to the student observer at distant periscope P, representing the observation instrument of an attacking submarine, for example.

Movement of carriage 11 along rails 12 toward the periscope P in the direction of arrow 48, unless compensated, causes sheaves 20 and 21 to roll along cables 18 and 19, respectively, and consequently to rotate in unison. Owing to the error imparted by this action, compensation is made in a well known manner, which forms no part of the present invention, by means of differential mechanism between motor 85 and cable 14 and the other cable drives, so that true rotations of sheaves 20 and 21 occur to compensate for their train station for range.

The lower sheave 21 drives through gearing 60 to supply values of true target bearing (B) to the upper input gear 61 of differential 41, the upper input gear 86 of differential 48, and to the upper input gear 87 of differential 46. The output of differential 48 is applied through shaft 49 and gear 49' to the large gear 54 of screen ships rotor 33, which angularly positions the rotor 33 to the value of target angle (A), modified when required by the oscillatory motion imparted by motor 50. From the fire control problem, target angle (A) = true target bearing (B) — target course (C) +180°, where target angle (A) is defined as the angle between the forward and aft axis of the target and the line of sight to the target. The output of differential 46 is applied through output gear 62, gear 63, lower large gear 45, tubular shaft 44 to member 43, which positions ship model 32 to the value of true target bearing (B), modified when required by the output of handwheel 42. This gives the effect in the distant periscope P of realistic steaming of the convoy with respect to the observer's own ship on which periscope P is assumed to be mounted. On the other hand, rotation of the upper sheave 20 drives through gearing 52 to supply the value of target course (C) to the lower input gear 88 of differential 41. The output of differential 41 is applied through gearing 40 and upper large gear 39 to shaft 38, which positions target ship 27 to the value of target angle (A) to simulate change of course of the convoy. This motion is transmitted through the train of gears 38', 47 to the attendant ship 32 and also by gear 64 to the floating sleeve gear 65, and thence to gears 66 and 67, which, respectively, drive shafts 68, 69 and shafts 70, 71, and rotate corresponding ship models 28, 31, and 29, 30, in time with the center target ship 27, in the same direction and at the same rate.

The upper sheave 20 also drives the bottom gear 89 of differential 51 whose output gear 72 drives the cross shaft 73 to drive slow speed and high speed follow-up transmitters 76 and 77, respectively, which energize follow-up or servomotor 80 to drive rotor 33 through reduction gearing 81, lower gear 82 of differential 48, shaft 49 and gearing 49' and 54.

By reason of the background of sea green curtains 56 and 56' and the erection of the ship models effected by the inverting lens of the periscope P, the student observer obtains a very realistic impression of a convoy of ships moving at sea in the field of view of his periscope with the range changing in accordance with the input from the calculator C, so that he can make his observation under simulated battle conditions through a periscope identical in all respects to that of a submarine periscope and equipped with a firing button for launching imaginary torpedoes when the periscope is properly oriented by him on a selected target among the convoy or convoying ships. By checking the student's operations of the firing button, an instructor can credit him with hits or misses, as the case may be. A rotating prism may also be provided in the periscope P, in a well known manner, in order to imitate the relative motion between the convoy and the attacking submarine carrying the periscope P, while angular change in apparent convoy heading is introduced by cable 18.

It will be observed that the steady rotation of screen ships rotor 33 from cable 18 through the gearing and other connections described is accompanied by an equal turning of each ship model through the intervening gearing 38', 47, 64, 65, 66, 67 and accompanying shafting 68, 69, 70 and 71, which gives the illusion of a convoy steaming full ahead. Also, change of course is given all ships of the model convoy by means of gear 39 driven from sheave 21, in turn rotated by cable 19. Furthermore, oscillatory motion is imparted to the screen ships rotor 33 only, by means of switch S at the observer's periscope P controlling motor 50, which introduces the corresponding oscillatory motion through the linkages 55 in the manner described. The zigzagging or evasive action of the convoy is thus realistically simulated in the field of view of the periscope P. Target angle (A) is represented by the angle of the target ship model 27, as is indicated in Fig. 1.

As previously mentioned, the convoy models may be replaced or shifted by disconnecting them from their bayonet joint connections 37 or 37', or replacing them with other models at will.

Although a preferred embodiment of the invention has been illustrated and described herein, it is to be understood that the invention is not limited thereby, but is susceptible of variations in form and detail within the scope of the appended claims.

1. In ordnance training apparatus including an observation instrument, the combination of a relatively remote target model, at least one stationary rail, a carriage mounted on said rail, a vertical shaft thereon, a support for said model carried by said shaft, a horizontal mechanism for moving said carriage along said rail, operative connections between said shaft and said support, and means driven independently of said mechanism for rotating said shaft and support, whereby said model is moved in the field of view of said instrument.

2. In ordnance training apparatus including an observation instrument, the combination of a relatively remote target model, at least one stationary rail, a carriage mounted on said rail, a rotor rotatable on said carriage about a vertical axis, a support for said model on said rotor rotatable about an axis displaced from the axis of rotation of said rotor, mechanism for moving said carriage, and means driven independently of said mechanism for rotating at least said support, whereby said model is oriented in the field of view of said instrument.

3. In ordnance training apparatus including an observation instrument, the combination of a relatively remote target model, at least one stationary rail, a carriage mounted on said rail, a rotor rotatable on said carriage about a vertical axis, a support for said model on said rotor rotatable about an axis displaced from the axis of rotation of said rotor, mechanism for moving said carriage, means driven independently of said mechanism for rotating said rotor, and means responsive to rotation of said rotor for rotating said support in the opposite direction, whereby apparent course of said model is maintained during its travel in the field of view of said instrument.

4. In ordnance training apparatus including an observation instrument, the combination of a plurality of relatively remote target models, a bodily movable rotor, a plurality of rotatable supports for said target models mounted on said rotor at points displaced from the axis thereof, means for bodily moving said rotor, means driven independently of said last named means for rotating the rotor about a substantially vertical axis, and means responsive to rotation of the rotor for simultaneously orienting said target model supports on said rotor.

5. In ordnance training apparatus including an observation instrument, the combination of a plurality of relatively remote target models, a bodily movable rotor, a plurality of rotatable supports for said target models on said rotor, mechanism connected to said rotor for driving the same bodily to simulate movement of the target models in the field of view of said instrument, and means driven independently of said mechanism for simultaneously rotating said model supports on said rotor about substantially vertical axes to maintain the apparent course of said models.

6. In ordnance training apparatus including an observation instrument, the combination of a plurality of relatively remote target models, at least one stationary rail, a carriage mounted on said rail, a rotor mounted about a vertical axis on said carriage, a relatively driven cable, a pulley driven by said cable, operative connections between said pulley and said rotor, and mechanism for moving said carriage, rotatable supports for said models on said rotor, and means responsive to rotation of said rotor for simultaneously rotating said model supports in the opposite direction, whereby said models apparently move in the same course in the field of view of said instrument.

7. In ordnance training apparatus including an observation instrument, the combination of a relatively remote carriage, a rotor mounted for movement about a vertical axis on said carriage, a plurality of spaced target models disposed in a substantially horizontal plane on said rotor in the field of view of said instrument, mechanism for moving said carriage, means driven independently of said mechanism for rotating said rotor on said carriage to simulate movement of said target models in the field of view of said instrument, and means responsive to said movement for simultaneously orienting said models on said rotor counter to said rotation thereof to maintain the apparent course of said target models.

8. In ordnance training apparatus including an observation instrument, the combination of a relatively remote carriage, a support mounted for movement about a vertical axis on said carriage, a plurality of spaced target models disposed in a substantially horizontal plane on said support in the field of view of said instrument, mechanism for moving said carriage, means driven independently of said mechanism for rotating said support on said carriage to simulate movement of said target models in the field of view of said instrument, means responsive to said movement for simultaneously orienting said models thereon counter to said rotation to maintain the apparent course of said target models, and means interposed in said last-named means for changing the orientation of said models at will.

9. In ordnance training apparatus including an observation instrument, the combination of a relatively remote carriage, a support mounted for movement about a vertical axis on said carriage, a plurality of spaced target models disposed in a substantially horizontal plane on said support in the field of view of said instrument, mechanism for moving said carriage, means driven independently of said mechanism for rotating said support on said carriage to simulate movement of said target models in the field of view of said instrument, and means for changing the position of at least one of said models relatively to the positions of the other models without changing the apparent course or speed of any of the models.

10. In target tracking training apparatus including an observation instrument, the combination of a relatively remote carriage, a rotor mounted for rotation about a substantially vertical axis on said carriage, mechanism for moving said carriage, means driven independently of said mechanism for rotating said rotor, a plurality of ship models mounted in inverted position on the underside of said rotor about said axis, and at least one flexible curtain suspended from said rotor behind said models for surveying movement relatively thereto in simulation of the surface of the sea.

11. In a target tracking training apparatus, the combination of a carriage, a rotor mounted for rotation thereon about a vertical axis, a plurality of ship models simulating a convoy disposed on said rotor between the periphery and the center thereof, center gearing for orienting corresponding models through the same angle, a plurality of separate gears mounting outlying models adjacent the periphery of said rotor, shafts extending from said center gearing to said separate gears for orienting said outlying models on said rotor, mechanism for rotating said rotor on said carriage about said vertical axis, and connections between said mechanism and said center gearing for causing like orientation of all of said models upon rotation of said rotor to simulate maintenance of course of said convoy.

12. In a target tracking training apparatus, the combination of a carriage, a rotor mounted for rotation thereon about a vertical axis, a plurality of ship models simulating a convoy disposed on said rotor between the periphery and the center thereof, center gearing for orienting corresponding models through the same angle, a plurality of separate gears mounting outlying models adjacent the periphery of said rotor, shafts extending from said center gearing to said separate gears for orienting said outlying models on said rotor, mechanism for rotating said rotor on said support about said vertical axis, connections between said mechanism and said center gearing for causing like orientation of all of said models upon rotation of said rotor to simulate maintenance of course of said convoy, and means for changing the position of at least one of said models relatively to the remainder without change of speed or course.

13. In a target tracking training apparatus, the combination of a carriage, a rotor suspended therefrom for rotation about a vertical axis, a relatively rotatable shaft coaxial therewith, a radially extending element on said shaft having a rotary fastening member displaced from the axis of said shaft, a plurality of additional rotary fastening members disposed on said rotor between said shaft and the periphery thereof, a plurality of inverted target models movably connected to corresponding rotary fastening members, means responsive to rotation of said rotor for simultaneously orienting said rotary members and the corresponding models through a common angle to maintain the apparent course of the models, and means independent of said last-named means for rotating said shaft and the said element for changing the relative position of the corresponding model relatively to the other models.

14. In a target tracking training apparatus, the combination of a carriage, a rotor suspended therefrom for rotation about a vertical axis, a relatively rotatable shaft coaxial therewith, a radially extending element on said shaft having a rotary fastening member displaced from the axis of said shaft, gearing interposed between said shaft and said rotary fastening member for maintaining the orientation of the latter, a plurality of additional rotary fastening members disposed in said rotor between said shaft and the periphery thereof, a plurality of inverted target models movably connected to corresponding rotary fastening members, means responsive to rotation of said rotor for simultaneously orienting said additional rotary members and the corresponding models through a common angle to maintain the apparent course of the models, and means independent of said last-named means for rotating said shaft and the said element for changing the relative position of the corresponding model relatively to the other models without changing the orientation of said corresponding model.

EUGENE ODIN.

REFERENCES CITED

The following references are of record in the file of this patent:

UNITED STATES PATENTS

| Number | Name | Date |
|---|---|---|
| 1,317,556 | Cooper | Sept. 30, 1919 |
| 2,042,697 | Baranoff | June 2, 1936 |
| 2,364,070 | Haile | Dec. 5, 1944 |
| 2,381,757 | Jones | Aug. 7, 1945 |
| 2,387,153 | Johnson | Oct. 16, 1945 |

FOREIGN PATENTS

| Number | Country | Date |
|---|---|---|
| 602,622 | Germany | Aug. 15, 1936 |